United States Patent
Wagner et al.

(10) Patent No.: US 11,896,982 B2
(45) Date of Patent: Feb. 13, 2024

(54) MATERIAL PROCESSING EQUIPMENT

(71) Applicant: Kleemann GmbH, Goppingen (DE)

(72) Inventors: Monika Wagner, Rechberghausen (DE); Christian Knoblich, Stuttgart (DE); Benjamin Kazmaier, Owen (DE)

(73) Assignee: Kleemann GmbH

( * ) Notice: Subject to any disclaimer, the term of this patent is extended or adjusted under 35 U.S.C. 154(b) by 96 days.

(21) Appl. No.: 17/498,293

(22) Filed: Oct. 11, 2021

(65) Prior Publication Data

US 2022/0111396 A1 Apr. 14, 2022

(30) Foreign Application Priority Data

Oct. 12, 2020 (DE) ...................... 10 2020 126 743.6

(51) Int. Cl.
*B02C 21/02* (2006.01)
*B02C 23/08* (2006.01)
*B02C 23/02* (2006.01)
*B65G 41/00* (2006.01)

(52) U.S. Cl.
CPC .............. *B02C 21/02* (2013.01); *B02C 23/02* (2013.01); *B02C 23/08* (2013.01); *B65G 41/002* (2013.01)

(58) Field of Classification Search
CPC ......... B02C 21/02; B02C 23/02; B02C 23/08; B65G 41/002; B65G 41/005
See application file for complete search history.

(56) References Cited

U.S. PATENT DOCUMENTS

| 4,383,651 A | * | 5/1983 | Couperus | B07B 1/005 241/101.76 |
| 4,598,875 A | * | 7/1986 | Bronson | B02C 23/12 241/101.76 |
| 9,586,764 B2 | | 3/2017 | Salminen et al. | |
| 10,710,093 B2 | | 7/2020 | Mcdevitt | |
| 2014/0224906 A1 | * | 8/2014 | Dunn | B02C 21/026 209/241 |
| 2018/0334332 A1 | | 11/2018 | Eberts | |

FOREIGN PATENT DOCUMENTS

| CA | 2121539 A1 | 10/1994 | | |
| DE | 3837700 C1 | 4/1990 | | |
| EP | 836374 A1 | 4/1998 | | |
| EP | 1655245 A1 | 5/2006 | | |
| EP | 2837583 A1 | * 2/2015 | ............. B02C 1/026 |

(Continued)

*Primary Examiner* — Gene O Crawford
*Assistant Examiner* — Abby A Jorgensen
(74) *Attorney, Agent, or Firm* — Lucian Wayne Beavers; Patterson Intellectual Property Law, PC

(57) ABSTRACT

A material processing device includes a conveyor belt for transporting material from or to a material processing unit. The conveyor belt is swivel connected to a machine body by an articulated link, wherein the conveyor belt can be moved from a folded-down working position into a folded-up transport position by an actuating unit and the articulated link. The articulated link is part of an actuating mechanism which guides a proximal free end of the of the conveyor belt during the swiveling motion from the folded-down working position to the folded-up transport position in such a way that the proximal end of the conveyor belt is swiveled and raised against the direction of gravity.

14 Claims, 5 Drawing Sheets

(56) References Cited

FOREIGN PATENT DOCUMENTS

| | | |
|---|---|---|
| EP | 2837583 A1 | 2/2015 |
| EP | 3041611 A1 | 7/2016 |
| EP | 3757040 A1 | 12/2020 |
| WO | 9737777 A1 | 10/1997 |
| WO | WO-9737777 A1 * 10/1997 | ............ B07B 1/005 |
| WO | 2015033011 A1 | 3/2015 |
| WO | WO-2016150727 A1 * 9/2016 | ............ B65G 21/12 |
| WO | WO-2018073067 A1 * 4/2018 | ............ B02C 23/02 |
| WO | WO-2019076488 A1 * 4/2019 | ............ B07B 1/005 |

\* cited by examiner

MATERIAL PROCESSING EQUIPMENT

BACKGROUND OF THE INVENTION

Field of the Invention

The invention relates to a material processing device, in particular a mobile mineral processing device, with a conveyor belt for transporting material from or to a material processing unit, wherein the conveyor belt has a proximal end area at the feed end and a distal end area at the discharge end, wherein a central area of the conveyor belt is formed between the proximal and distal end areas of the conveyor belt, wherein at its proximal end area, the conveyor belt is swivel connected to a machine body by means of an articulated link, and wherein the conveyor belt can be moved from a folded-down working position to a folded-up transport position by means of a control element and the articulated link.

Description of the Prior Art

EP 2 837 583 A1 (U.S. Pat. No. 10,710,093) discloses a material processing device, which has a crusher unit for crushing mineral material as a material processing unit. A screening unit is provided downstream of the crusher unit. In this screening unit, the crushed material coming in from the crusher unit can be sorted. A conveyor belt is provided below the screening unit, which conveyor belt receives the screened rock fraction at its proximal end area. The conveyor belt can be used to transport the fed material to the conveyor's distal end and to discharge it there, for instance onto a bulk material pile. To adjust the conveyor belt between a working position and a transport position, it can be swiveled relative to the machine frame of the material processing equipment by means of an articulated link. The swiveling occurs around a swivel axis that is essentially parallel to the ground.

EP 3 041 611 (U.S. Pat. No. 9,586,764) discloses a material processing device which also has a crusher unit. Several conveyor belts are provided, which are used to feed the material to be crushed to the crusher unit or to discharge the crushed material from the crusher unit. In addition, a screening unit is provided, which is used to classify the crushed material. The screening unit and the conveyor belts can be moved from a set-up working position to a folded-down transport position.

Material processing equipment of the type according to the invention is used, for instance, to crush bulk material (for instance, coarsely crushed concrete or other mineral rock material) on site in a crusher unit as a material processing unit. The crushed material can then be used further either directly at the construction site or in some other suitable way.

Further material processing devices according to the invention are used to screen bulk material, for instance mineral bulk material, in a screening unit forming a material processing unit. Different rock fractions are formed in the process. The rock fractions are then either fed to another material processing unit or conveyed to bulk material piles.

Combined material processing devices in which these two types of machines are combined and which accordingly comprise a crusher unit and a screening unit, such as the aforementioned EP 2 837 583 A1 (U.S. Pat. No. 10,710,093), shall also be included in the context of the invention.

After the work is completed, the material processing equipment is converted and placed in a transport configuration that permits the material processing equipment to be positioned on a flatbed truck to save space. For this purpose, the conveyor belt in material processing equipment known from the prior art is swiveled and brought into a transport position.

SUMMARY OF THE INVENTION

The invention addresses the problem of providing a material processing device of the type mentioned above, which can be used to implement a space-saving design in a simple manner.

The problem is solved in that the articulated link is part of an actuating mechanism actuated by the actuating unit, which actuating mechanism guides the proximal free end of the proximal end area of the conveyor belt during the swiveling motion from the folded-down working position to the folded-up transport position in such a way that the proximal end of the conveyor belt is swiveled and raised against the direction of gravity.

According to the invention, the conveyor belt is swiveled against the direction of gravity from the folded-down working position to the folded-up transport position and the proximal end is simultaneously raised against the direction of gravity. This represents a significant difference to the prior art, wherein the proximal end is first lowered during this adjusting motion of the conveyor belt. This means that a swivel range below the proximal end is required for the adjustment motion in order to avoid a collision with the ground. In contrast, the solution according to the invention requires less installation space below the proximal end. Accordingly, the proximal end section of the conveyor belt can be disposed in a low position close to the ground in the working position. In this way, the required overall height of the material processing equipment can be reduced. Starting from the working position, the adjusting mechanism can be used to easily swivel the conveyor belt into the transport position. In the transport position, the conveyor belt does not interfere with the loading and transport of the material processing equipment on the flatbed truck.

According to a preferred embodiment of the invention, provision can be made that the proximal end of the conveyor belt in the working position is disposed below a machine body of the material processing device in such a way that the discharge area of a material conveying device of the material processing device ends against the direction of gravity above the proximal end area of the conveyor belt, and that, in the transport position, the proximal end of the conveyor belt is laterally and horizontally spaced apart from the discharge area of the material conveying device.

A conceivable variant of the invention is such, that the adjusting mechanism comprises a first link and a second link, that the first link is swivel coupled to a machine body of the material processing by means of a second joint and to the proximal end area of the conveyor belt by means of a first joint, that the second link is swivel coupled to the machine body of the material processing device by means of a fourth joint and to the proximal end area of the conveyor belt by means of a third joint, and that the first joint and the third joint have different distances from the proximal end. In this way, a four-bar linkage system is formed, which can be used to guide the conveyor belt safely and stable during the swivel motion in a simple manner. Preferably, the axes of articulation formed by the joints are aligned in parallel to each other. Such a mechanism is used to move the proximal end of the conveyor belt along a curved path. Depending on the geometry of the links and the positioning of the joints, the curve path can be set accordingly and adapted to the available space in the material processing equipment.

In this case, a particularly stable suspension of the conveyor belt can be achieved if a first link and a second link are disposed on each of the two sides of the proximal end area extending from the proximal end to the distal end, wherein the joints of the links are interaligned in pairs to form common swivel axes.

For this purpose provision can be made in particular that the first link has a first lever length between the first joint and the second joint and the second link has a second lever length between the third joint and the fourth joint, and that the lever lengths differ. The third joint of the second link is located closer to the proximal end of the conveyor belt than the first joint of the first link. Particularly preferably provision can be made that the first link has a longer lever length than the second link. With such an arrangement, the forces acting due to the weight of the conveyor belt can be safely transferred via the actuating mechanism. The motion of the proximal end can be minimized in this way.

In this context, particularly provision can be made that the ratio of the second lever length to the first lever length is selected to be 1:2 to 1:3, particularly preferably 1:2.3 to 1:2.7.

For a simple and space-saving structure, provision can be made that at least one of the links of the actuating mechanism has a coupling piece to which a force transmission means of the actuating unit is coupled. Preferably, the coupling piece is used on the aforementioned link with the longer lever arm. Alternatively, the power transmission means can be directly coupled to the conveyor belt It is also conceivable that an actuator, in particular a linear actuator, preferably a hydraulic cylinder, is swivel coupled to one of the links to permit the conveyor belt to be adjusted between the working position and the transport position.

If provision is made that the power transmission means is a traction means, in particular a floppy, i.e. flexible, component, which is coupled to an actuator of the actuating unit, in particular to a motor or a hydraulic unit, preferably to a hydraulic cylinder, then a design for reliably adjusting the conveyor belt using little assembly effort and few parts can be achieved. A rope or chain, for instance, can be used as the traction means.

To reliably secure the conveyor belt in the working position and/or the transport position, provision can be made to provide a holder at the proximal end area of the conveyor belt, to which holder a securing element is connected by means of a first bearing, and that the securing element has a second bearing, by means of which the securing element is attached to a support of the material processing device in the working position and/or the transport position of the conveyor belt.

For this purpose, additionally or alternatively provision may be made that a stop is disposed on one of the links, which in the working position and/or in the transport position rests against a counter stop of the material processing device. In this case, a form-fitting contact between the stop and the counter stop can be provided, to reliably transfer the load of the conveyor belt to the machine body.

A particularly preferred variant of the invention is such that the conveyor belt has a base part forming the proximal end area, that a swivel bearing is used to connect a conveyor belt part to the base part, and that the swivel bearing can be used to swivel the conveyor belt part relative to the base part, wherein the swivel axis preferably extends perpendicular to the conveying direction of the conveyor belt. Preferably, provision can be made in particular that the conveyor belt part forms the distal end area of the conveyor belt. The conveyor part can be swiveled relative to the base part for a space-saving positioning of the conveyor belt. Accordingly, the adjusting mechanism can be used to swivel the conveyor belt from its folded-down working position to its folded-up transport position. In addition, the conveyor part can then be folded down relative to the base part. In other words, the conveyor belt part is then no longer in stretched alignment with the base part but is angled relative to the base part. Preferably, this results in an angle between the long side of the base part and the long side of the conveyor belt part in the range from 45° to 135°, preferably an angle in the range from 80° to 100°. Preferably, in the folded-down position, the conveyor belt part is positioned laterally against the material processing device. Further preferably, the swivel axis of the swivel bearing is aligned transversely to the conveying direction of the conveyor belt. In particular, the swivel axis of the swivel bearing can be aligned transversely to the conveying direction of the conveyor belt in such a way that, in the folded-down position, the conveyor belt part extends in the direction of travel of a mobile material processing device.

A conceivable variant of the invention may be such that the material processing unit is a screening unit, wherein the screening unit comprises at least one, preferably at least two screening decks disposed one above the other, wherein the material screened through at least one screening deck is indirectly or directly conveyed by the screening unit onto the proximal end area of the conveyor belt. Here, for instance, provision can be made that the material screened out by the screening unit is conveyed out of the working area of the screening unit and to the proximal end area of the conveyor belt via a transfer belt.

In this context, it is also conceivable that the screening unit has a discharge area, wherein the discharge area is connected to the upper side of a screening deck, wherein the discharge area is routed indirectly or directly to a return belt, and that the return belt has a discharge end, which can be used to feed the conveyor belt material conveyed by the return belt to a material processing unit, in particular a crusher unit.

BRIEF DESCRIPTION OF THE DRAWINGS

The invention is explained in greater detail below based on an exemplary embodiment shown in the drawings. In the Figures.

DETAILED DESCRIPTION

Figure 1:
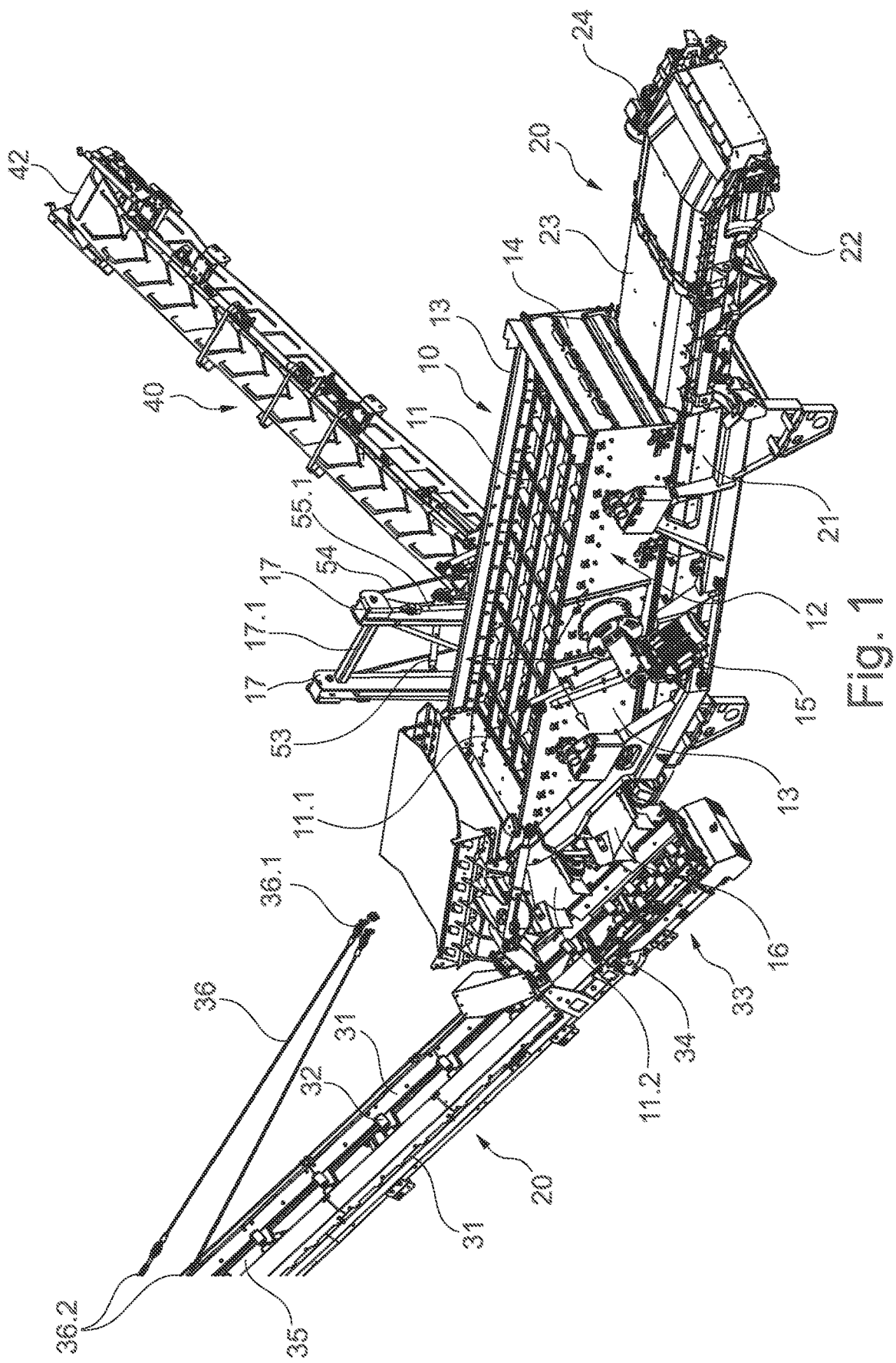
FIG. 1 shows a perspective view of a crusher unit of a material processing device.

FIG. 1 shows a material processing device 10 having a material processing unit, which is designed as a screening unit in this case. The screening unit has several screen decks 11 superposed in a machine body 12. The machine body 12 forms the screen housing of the screening unit. The screen decks 11 are superposed in the direction of gravity.

The machine body 12 has two mutually parallel side panels 13, which are interconnected by a rear wall 14. A vibratory drive 15 is disposed on the machine body 12. This vibratory drive 15 can be used to vibrate the individual screen decks 11. As can be seen from the drawing, the screen decks 11 are inclined relative to the horizontal in the image plane, sloping from the right to the left. The screen decks 11 have differing mesh sizes. The uppermost screen deck 11 has the largest mesh size. The uppermost screen deck 11 merges into a discharge area 11.1 in the direction of transport. Material fed onto the upper screen deck 11 is screened at this screen deck 11. The material parts which do not fall through the screen deck 11 because of their size are routed to the discharge area 11.1. The discharge section 11.1 conveys the material to a first transfer belt 11.2. This first transfer belt 11.2 receives the material coming from the discharge area 11.1 and conveys it transversely to the conveying direction of the discharge area 11.1 to a return belt 30.

The return belt 30 has two lateral longitudinal struts 31 extending in the direction of conveyance of the return belt 30. The longitudinal struts 31 are part of a support structure of the return belt 30. Rollers 32 are attached to this support structure. An endless circulating conveyor belt (not shown) can travel along the rollers 32.

A hopper 34 of the return belt 30 is disposed below the first transfer belt 11.2. This hopper 34 prevents the material coming from the first transfer belt 11.2 from falling sideways off the return belt 30.

Starting from a receiving area 33 formed in the area of the hopper 34, the conveyor belt conveys the material to a discharge end 35. A material processing unit, in particular a crusher unit, can be connected to the discharge end 35. In this crusher unit, the material is picked up and crushed. The crusher unit may be a jaw crusher, a rotary impact crusher, or other rock crusher.

As can be seen in FIG. 1, attachment pieces 36.2 are used to attach tension elements 36 to the return belt 30 in the area of the discharge end 35. The tension elements 36 may be formed by, for instance, cables or chains. The tension elements 36 bear further attachment pieces 36.1 at their ends facing away from the discharge end 35. These attachment pieces 36.1 can be used to attach the tension elements 36 to a machine component not shown. In this way, the return belt 30 is stabilized.

The screening unit has another screen deck 11 below the upper screen deck 11, which is no longer visible in the illustration according to FIG. 1, because it is disposed in the machine body 12.

The screen deck located below the upper screen deck 11 has a mesh size that is smaller than the mesh size of the upper screen deck 11. The material screened out by the screen decks 11 passes onto a fine-grain belt 20. The fine-grain belt 20 has an endlessly circulating conveyor belt, which has its feed area below the machine body 12. The screened material falls onto this feed area and the fine grain belt 20 transports it to the discharge end 22 of the fine grain belt 20. At the discharge end 22, the screened material exits the material processing device 10 and is conveyed to a bulk material pile or fed to another processing device. To prevent material from falling off the side of the fine grain belt 20, a cover 23 may be provided to cover the fine grain belt 20 adjacent the machine body 12.

The fine-grain belt 20 has a support structure 21. This support structure 21 connects the fine-grain belt 20 to the machine body 12. A drive 24 to drive the endlessly circulating conveyor belt is provided in the area of the discharge end 22.

Coupling pieces are provided for attaching the assembly consisting of the screening unit and the fine grain belt 20 to a material processing unit. These coupling pieces can be used to bolt this assembly unit to the material processing unit. The material processing unit may include the crusher unit described above.

As described above, material is screened from the upper screen deck 11. It falls onto the screen deck 11 below. The material fraction not screened by the screen deck 11 below is conveyed by the screening unit to a second transfer belt 16. The conveying direction of the second transfer belt 16 runs transversely to the conveying direction of the screen deck 11. The screened material passes to a conveyor belt 40 via the second transfer belt 16.

Figure 2:
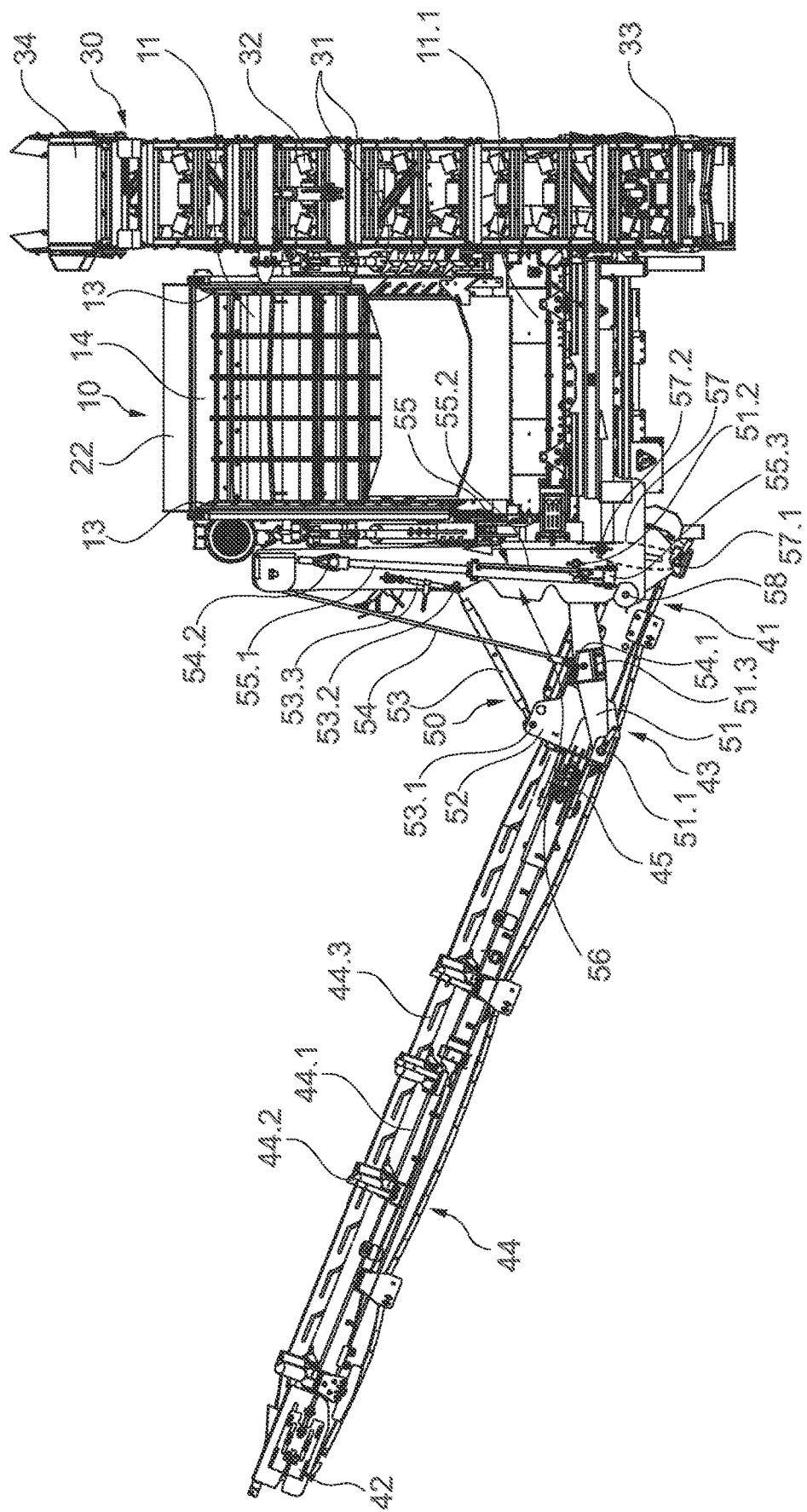
FIG. 2 shows a perspective rear view of the material processing device in accordance with FIG. 1.

FIG. 2 shows the structure of this conveyor belt 40 in more detail. As the image shows, the conveyor belt 40 may have a structure that is basically the same as the structure of the return belt 30.

Accordingly, two struts 44.1 extending in the longitudinal direction of the conveyor belt 40 are used. The struts 44.1 are part of a support structure. Rollers 44.2 for an endlessly circulating conveyor belt 44.3 are attached to the support structure. The conveyor belt 44 has a proximal end area 41 on the feed side. This proximal end area is assigned to the sieve unit. The proximal end area forms a proximal end. At the opposite end, the conveyor belt 40 has a distal end area with a distal end 42.

The proximal end area 41 is formed by a base part 43. In contrast, the distal end area and its distal end 42 are formed by a conveyor belt part 44. A center area of the conveyor belt 40 is formed between the proximal end area 41 and the distal end area. This center area of the conveyor belt 40 is formed by the conveyor belt part 44.

A swivel bearing 45 is used to couple the base part 43 to the conveyor part 44. By means of the swivel bearing 45, the conveyor belt part 44 can be swiveled relative to the base part 43. The swivel axis runs perpendicular to the conveying direction of the conveyor belt 44 and in a plane that is parallel to the image plane according to FIG. 2.

The base part 43 of the conveyor belt 40 includes a laterally disposed holder 52. A securing element 53 can be attached to this holder 52. For this purpose, the securing element 53 has a bearing 53.1, which is used to swivel couple the securing element to the holder 52. At the opposite end, the securing element 53 has a further bearing 53.2. This further bearing 53.2 is used to swivel couple the securing element 53 to the machine body 12.

For instance, the assignment can be made such that vertical supports 17 are attached to the machine body 12. For bracing against each other, the two supports 17 can be interconnected by means of a cross strut 17.1. The securing element 53 is attached to one of the supports 17. The securing element 53 can be used to brace the conveyor belt 40 in the working position shown in FIG. 2.

As FIG. 2 further shows, an actuating mechanism 50 is provided. The actuating mechanism 50 includes a first link 51 and a second link 57. The first link 51 is swivel coupled to the base part 43 by means of a first joint 51.1. A second joint 51.2 of the first link 51 is swivel coupled to the machine body 12, for instance as in this case to a support 17. The actuating mechanism 50 may also be referred to as an actuating linkage 50 or as an adjusting mechanism 50. The first and second joints 51.1 and 51.2 may be referred to as first and second swivel joints 51.1 and 51.2.

The second link 57 is shown dashed in the drawings 2 and 3. It is swivel coupled to the base part 43 of the conveyor 40 by a third joint 57.1. A fourth joint 57.2 connects the second link 57 to the machine body 12. For instance, the fourth joint 57.2 may be provided on the support 17, which is coupled to the machine body 12. The third and fourth joints 57.1 and 57.2 may be referred to as third and fourth swivel joints 57.1 and 57.2.

As can be seen from FIG. 2, the third joint 57.1 is located closer to the proximal end of the conveyor belt 40 than the first joint 51.1.

FIG. 2 further shows that the first link 51 has a first lever length extending from the first joint 51.1 to the second joint 51.2. The second link 57 has a second lever length extending from the third joint 57.1 to the fourth joint 57.2. The assignment is made such that the first lever length is greater than the second lever length. Preferably, the length of the first lever is at least twice that of the second lever. Particularly preferably, the ratio of second lever length to first lever length is selected in the range from 1:2 to 1:3, preferably this ratio is in the range from 1:2.3 to 1:2.7.

The axes of articulation formed by the joints 51.1, 51.2, 57.1, 57.2 are parallel to each other. In this manner, a four-bar linkage system is formed about which the proximal end area 41 can be swiveled relative to the machine body 12.

Within the scope of the invention, provision may be made that a first link 51 and a second link 57 are disposed on either side of the conveyor belt 40. For reasons of reducing the number of parts required, the links 51, 57 are preferably of identical design.

The opposing joints 51.1, 51.2, 57.1, 57.2 of the links 51, 57 have axes of articulation that are interaligned to keep up the four-bar linkage system. The opposing joints 51.1, 51.2, 57.1 and 57.2 form first, second, third and fourth common swivel axes, respectively.

FIG. 2 further shows that the first link 51 has a coupling piece 51.3. A coupling point 54.1 is used to attach a power transmission means 54 to this coupling piece 51.3. The power transmission means 54 is a floppy component, for instance a rope or a chain.

The power transmission means 54 is routed via a deflector, for instance a deflection pulley. The deflector is attached to one of the supports 17 in the area of the cross strut 17.1. Downstream of the deflectors, the force transmission means 54 has a second coupling point 54.2. This coupling point 54.2 is connected to a control element 55. The control element 55 has an actuator 55.2, which may be a hydraulic cylinder.

The hydraulic cylinder comprises a cylinder, in which a piston is guided. A piston rod 55.1 is connected to the piston. The piston rod 55.1 is connected to the coupling point 54.2. The actuator 55.2 has a coupling member 55.3. It is used to connect the actuator to the machine body 12, preferably to the support 17.

In the position shown in FIG. 2, the conveyor belt 40 is in a first working position, which is a home position. To immobilize this home position, the conveyor belt 40 has a stop 58. This stop 58 is supported on a first counter stop 18.1 on the machine body 12 in a form-fitting manner, such that the distal end 42 cannot be lowered any further.

Starting from the home position shown in FIG. 2, the conveyor belt 40 can be folded up against the direction of gravity, i.e. swiveled upwards against the direction of gravity. To this end, first the securing element 53 is removed and then the actuator 55.2 is actuated. Then the piston rod 55.1 pulls into the cylinder and the power transmission means 54 is pulled. In this way, the power transmission means 54 on the coupling piece 51.3 lifts the first link 51. In so doing, the actuating mechanism performs the swiveling motion shown in FIGS. 5 and 6.

Figure 6:
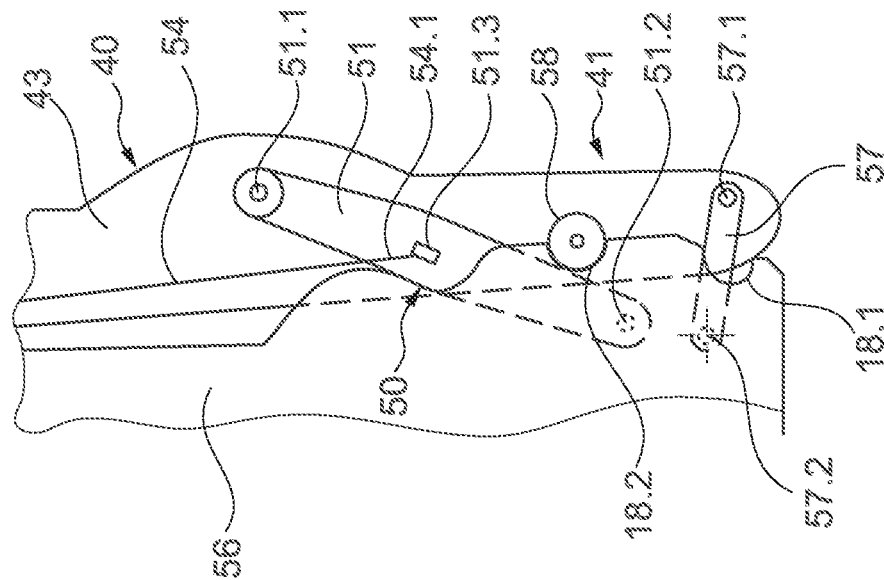
FIG. 5 shows a side view of a swivel mechanism in a working position as a concept sketch and FIG. 6 shows a concept sketch of the swivel mechanism of FIG. 5 in a transport position.
Figure 5:
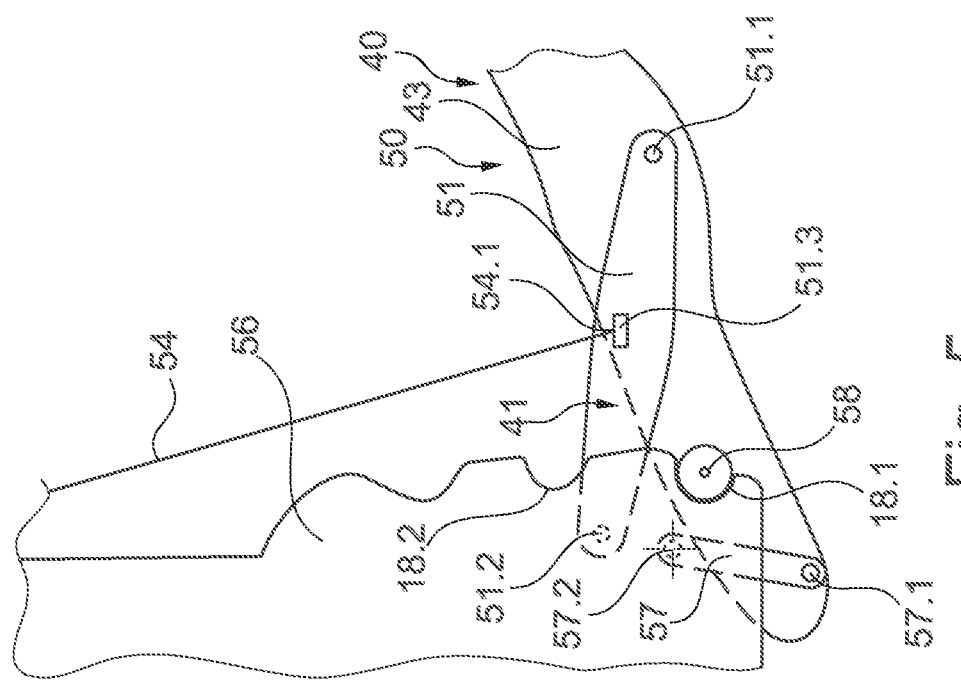

As FIGS. 5 and 6 show, during the swiveling motion, the proximal end of the conveyor belt 40, which is formed by the end section of the proximal end area 41 projecting beyond the first joint 57.1, is guided from the home position shown in FIG. 5 below the machine body 12 towards the side of the machine body 12. The swiveling motion is such that the proximal end is guided along an arcuate path and is not lowered or only slightly. In this way, the proximal end of the conveyor belt 40 is prevented from colliding with an area beneath, such as the ground.

Figure 3:
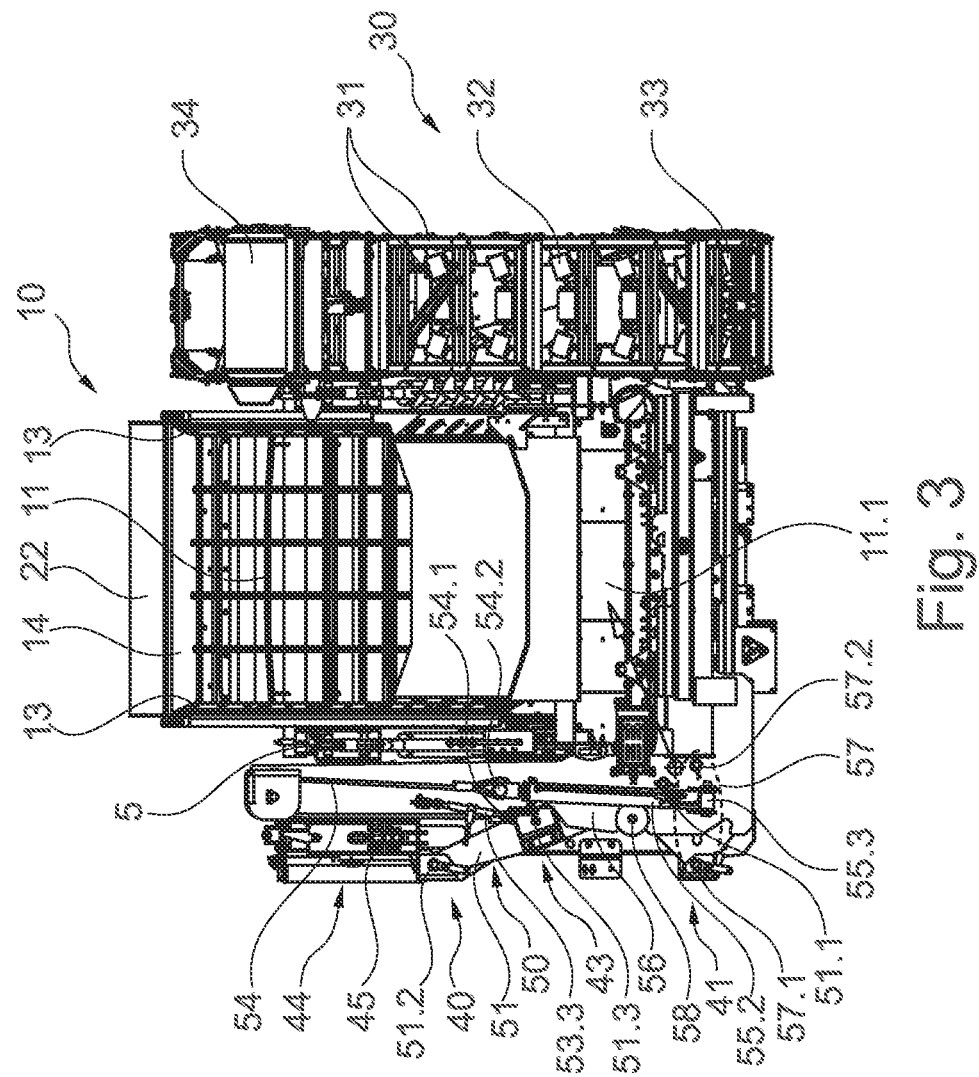
FIG. 3 shows the representation of FIG. 2 in a different operating position.
Figure 4:
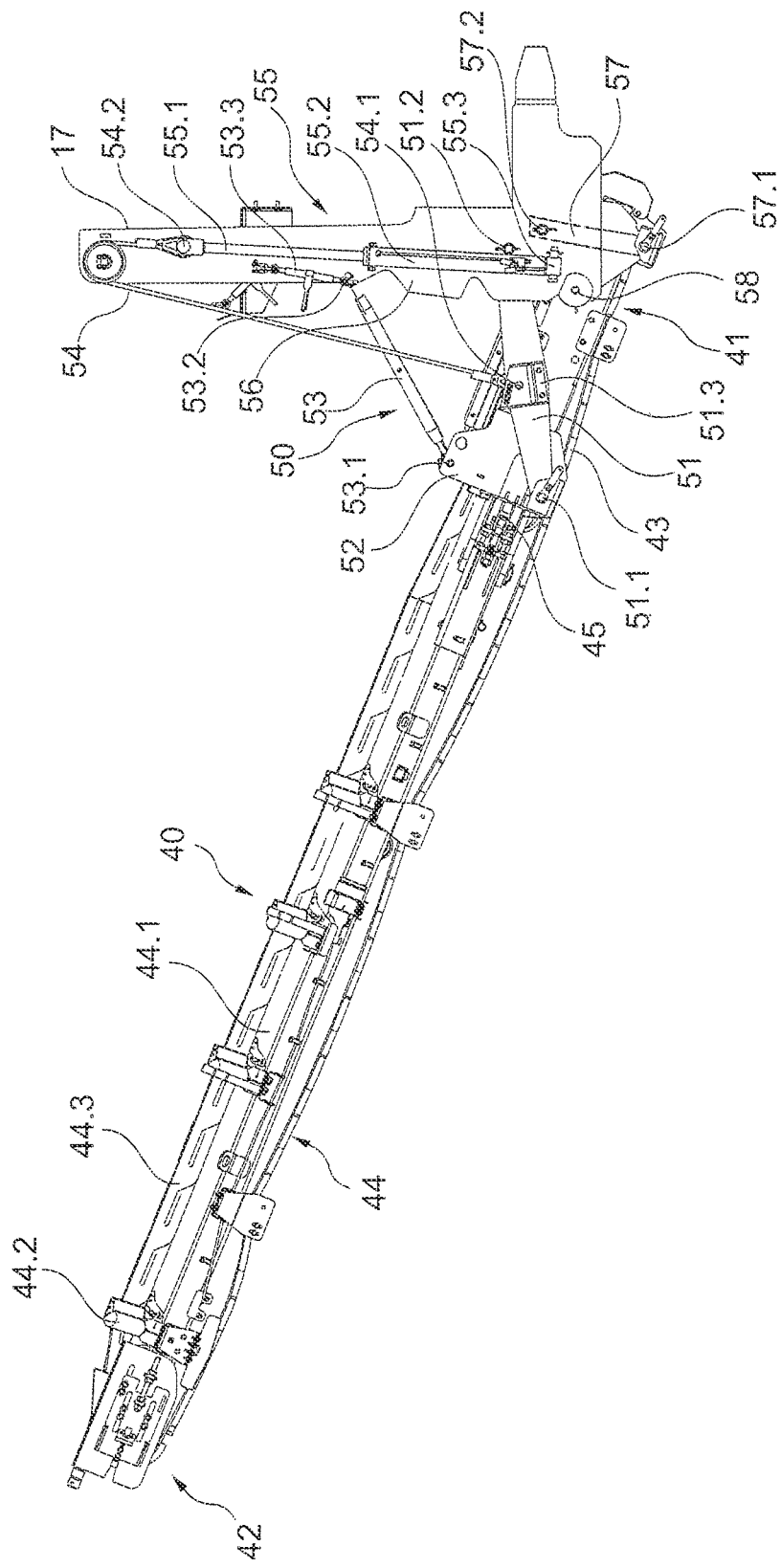
FIG. 4 shows a detail taken from FIG. 2.

In FIG. 6, the conveyor belt 40 is in the folded-up transport position. This is also shown in FIG. 3. The swivel motion is limited by the stop 58, which comes into contact with a second counter stop 18.2 on the machine body side in a form-fitting manner.

When the conveyor belt 40 is in the folded-up transport position, the conveyor belt part 44 can be folded down around the swivel bearing 45 relative to the base part 43. The conveyor belt part 44 is then folded down in the direction of gravity until it comes to rest on the side of the machine body 12. In this way, a compact design is achieved in the transport position.

The conveyor belt 40 cannot only be adjusted in the home position shown in FIG. 2. Rather, the base part 43 of the conveyor belt 40 can also be swiveled to any intermediate position between the home position shown in FIG. 2 and the folded-up position shown in FIG. 3. For this purpose, the actuator 55.2 is operated and the piston rod 55.1 is retracted until the desired swivel position of the conveyor belt 40 is reached. This swivel position can be secured, for instance, using the securing element 53, relieving the actuator 55.2. For this purpose, in particular, a tensioning device 53.3 can be used, which can be used to continuously adjust the length of the telescopic securing element 53 between the two bearings 53.1, 53.2.

As FIGS. 2, 5 and 6 show, the counter stop 18.1 and/or the stop 18.2 can be formed by a support body 56. For instance, this support body 56 can be formed by a sheet metal blank coupled to the machine body 12.

In the first working position (according to FIG. 2), the support body 56 can be used to transfer part of the load of the conveyor belt 40 into the machine body 12.

The stop 18.2 can be used, for instance, to securely support the conveyor belt 40 in the transport position shown in FIG. 6.

The invention claimed is:

1. A material processing apparatus, comprising:
   a machine body;
   a conveyor belt for conveying material, the conveyor belt including a proximal end area adjacent a proximal free end of the conveyor belt and a distal end area adjacent a discharge end of the conveyor belt, the conveyor belt further including a central area between the proximal end area and the distal end area;
   an actuating linkage providing a swivel connection of the proximal end area of the conveyor belt to the machine body such that the conveyor belt is movable between a folded-down working position and a folded-up transport position;
   an actuator configured to move the conveyor belt between the folded-down working position and the folded-up transport position;
   wherein the actuating linkage and the actuator are configured such that during swiveling motion of the conveyor belt from the folded-down working position to the folded-up transport position, the proximal free end of the conveyor belt is swiveled and raised against a direction of gravity; and wherein the actuating linkage includes:
a first link swivel coupled to the proximal end area of the conveyor belt by a first swivel joint and to the machine body by a second swivel joint, wherein the first link has a first lever length between the first swivel joint and the second swivel joint;
a second link swivel coupled to the proximal end area of the conveyor belt by a third swivel joint and to the machine body by a fourth swivel joint, wherein the second link has a second lever length between the third swivel joint and the fourth swivel joint, the first lever length being longer than the second lever length;
wherein the first swivel joint and the third swivel joint have different distances from the free proximal end of the conveyor belt;
wherein the third swivel joint of the second link is coupled closer to the free proximal end of the conveyor belt than is the first swivel joint of the first link; and
wherein a ratio of the second lever length to the first lever length is in a range of from 1:2 to 1:3.

2. The material processing apparatus of claim 1, further comprising:
a transfer conveyor mounted on the machine body and defining a discharge area;
wherein when the conveyor belt is in the folded-down working position the free proximal end of the conveyor belt is disposed below the machine body such that the discharge area of the transfer conveyor is located above the proximal end area of the conveyor belt relative to the direction of gravity; and
wherein when the conveyor belt is in the folded-up transport position the free proximal end of the conveyor belt is laterally spaced from the discharge area of the transfer conveyor.

3. The material processing apparatus of claim 1, wherein:
the ratio of the second lever length to the first lever length is in a range of from 1:2.3 to 1:2.7.

4. The material processing apparatus of claim 1, wherein:
at least one of the first and second links includes a coupling piece connected to the actuator by a force transmission element.

5. The material processing apparatus of claim 4, wherein:
the force transmission element is a flexible force transmission element.

6. The material processing apparatus of claim 5, wherein:
the actuator includes a hydraulic cylinder.

7. The material processing apparatus of claim 1, wherein:
the proximal end area of the conveyor belt includes a holder;
the machine body includes a support; and
the material processing apparatus further includes a securing element connected at a first bearing to the holder and at a second bearing to the support.

8. The material processing apparatus of claim 1, further including:
a stop disposed on one of the first and second links and a first counter stop defined on the machine body, the stop and the first counter stop being configured such that in the folded-down working position of the conveyor belt the stop rests against the first counter stop.

9. The material processing apparatus of claim 1, wherein:
the first link is one of a pair of aligned first links disposed on opposite sides of the proximal end area of the conveyor belt and the second link is one of a pair of aligned second links disposed on opposite sides of the proximal end area of the conveyor belt;

wherein each first link is swivel coupled to the proximal end area of the conveyor belt by its first swivel joint and to the machine body by its second swivel joint such that the first swivel joints form a first common swivel axis and the second swivel joints form a second common swivel axis; and each second link is swivel coupled to the proximal end area of the conveyor belt by its third swivel joint and to the machine body by its fourth swivel joint such that the third swivel joints form a third common swivel axis and the fourth swivel joints form a fourth common swivel axis.

10. The material processing apparatus of claim 1, wherein the conveyor belt further comprises:
a base part forming the proximal end area;
a conveyor belt part including the distal end area; and
a swivel bearing connecting the conveyor belt part to the base part, the swivel bearing being configured to swivel the conveyor belt part relative to the base part, and the swivel bearing having a swivel axis extending perpendicular to a conveying direction of the conveyor belt.

11. The material processing apparatus of claim 1, further comprising:
a screening deck configured such that material screened through the screening deck is indirectly or directly conveyed onto the proximal end area of the conveyor belt.

12. The material processing apparatus of claim 11, further comprising:
a discharge area connected to an upper side of the screening deck; and
a return belt arranged to receive material from the discharge area and to feed the material to a crusher unit.

13. The material processing apparatus of claim 11, further comprising:
a fine-grain belt disposed below the screening deck and configured to collect a screened-out fine-grain fraction and transport the screened-out fine-grain fraction to a discharge end of the fine-grain belt.

14. A material processing apparatus, comprising:
a machine body;
a conveyor belt for conveying material, the conveyor belt including a proximal end area adjacent a proximal free end of the conveyor belt and a distal end area adjacent a discharge end of the conveyor belt, the conveyor belt further including a central area between the proximal end area and the distal end area;
an actuating linkage providing a swivel connection of the proximal end area of the conveyor belt to the machine body such that the conveyor belt is movable between a folded-down working position and a folded-up transport position, wherein the actuating linkage includes a first link swivel coupled to the proximal end area of the conveyor belt by a first swivel joint and to the machine body by a second swivel joint and a second link swivel coupled to the proximal end area of the conveyor belt by a third swivel joint and to the machine body by a fourth swivel joint;
an actuator configured to move the conveyor belt between the folded-down working position and the folded-up transport position, wherein the actuating linkage and the actuator are configured such that during swiveling motion of the conveyor belt from the folded-down working position to the folded-up transport position, the proximal free end of the conveyor belt is swiveled and raised against a direction of gravity;

a stop disposed on one of the first and second links and a first counter stop defined on the machine body, the stop and the first counter stop being configured such that in the folded-down working position of the conveyor belt the stop rests against the first counter stop; and a second counter stop defined on the machine body, the stop and the second counter stop being configured such that in the folded-up transport position of the conveyor belt the stop rests against the second counter stop.

\* \* \* \* \*